(12) United States Patent
Prabhu et al.

(10) Patent No.: US 7,237,096 B1
(45) Date of Patent: Jun. 26, 2007

(54) STORING RESULTS OF PRODUCER INSTRUCTIONS TO FACILITATE CONSUMER INSTRUCTION DEPENDENCY TRACKING

(75) Inventors: Julian A. Prabhu, Palo Alto, CA (US); Atul Kalambur, Sunnyvale, CA (US); Sudarshan Kadambi, Hayward, CA (US); Daniel L. Liebholz, Burlington, MA (US); Julie M. Staraitis, Burlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 403 days.

(21) Appl. No.: 10/818,043

(22) Filed: Apr. 5, 2004

(51) Int. Cl.
G06F 9/30 (2006.01)

(52) U.S. Cl. ................ 712/218; 712/217
(58) Field of Classification Search ............... None
See application file for complete search history.

(56) References Cited

U.S. PATENT DOCUMENTS

| | | | |
|---|---|---|---|
| 5,497,493 A * | 3/1996 | Colwell et al. ............. 712/23 |
| 5,737,629 A | 4/1998 | Zuraski et al. |
| 5,752,271 A | 5/1998 | Yung |
| 6,094,719 A | 7/2000 | Panwar |
| 6,230,253 B1 * | 5/2001 | Roussel et al. ............. 712/22 |
| 6,381,689 B2 * | 4/2002 | Witt et al. ................ 712/215 |
| 6,463,525 B1 * | 10/2002 | Prabhu ..................... 712/222 |
| 6,493,819 B1 | 12/2002 | Mahurin et al. |
| 2002/0129224 A1 | 9/2002 | Leber et al. |

OTHER PUBLICATIONS

Burns, Christine, "Softway readies 64-bit UNIX applications for NT," Feb. 2, 1999. Obtained via: http://www.networkworld.com/archive/1999/57493_02-01-1999.html.
U.S. Appl. No. 10/728,039, titled "Method and Processor for Facilitating Greater-Width Store Operations of Lesser-Width Source Values" filed Dec. 4, 2003, naming as inventors Atula Kalambur et al.

* cited by examiner

Primary Examiner—Eddie Chan
Assistant Examiner—Jacob Petranek
(74) Attorney, Agent, or Firm—Darby & Darby PC; John W. Branch

(57) ABSTRACT

If a consumer instruction specifies a 64 bit source register comprised of results provided by two 32 bit producer instructions, the number of dependencies that must be tracked per source register can be decreased by transforming one or more of the 32 bit producer instructions so that rather than simply storing its result in a 32 bit destination register, the transformed instruction stores its result into a 64 bit logical register along with another 32 bit value held in another 32 bit register.

12 Claims, 5 Drawing Sheets

STORING RESULTS OF PRODUCER INSTRUCTIONS TO FACILITATE CONSUMER INSTRUCTION DEPENDENCY TRACKING

BACKGROUND

1. Field of the Invention

This invention relates generally to storing results of processor instructions into registers, and more particularly to storing instruction results in such a way that the number of dependencies per register is decreased.

2. Description of the Related Art

Computer programs are generally designed to be executed in a particular order. For example, a program that implements the Pythagorean theorem ($A^2+B^2=C^2$) might instruct a computer to first determine the value of $A^2$ and store the result in a first register, then to determine the value of $B^2$ and store that result in a second register. Finally, the program would instruct the processor to add the contents of the first and second register to arrive at the value of $C^2$. As is apparent from this example, the value of $C^2$ cannot be determined until the values of both $A^2$ and $B^2$ are known.

Many modern processors, however, are capable of executing multiple instructions simultaneously (parallel processing), in a different order than specified by the computer program (out of order execution), or even of executing certain instructions based on a "guess" (predictive branching). Processors using some or all of these techniques may be able to execute a given set of instructions much quicker than processors executing instructions sequentially in the order specified by a program. In cases like the example above, however, even the most modern processors cannot add the values of $A^2$ and $B^2$ until those two values are known.

When a processor cannot perform a particular instruction, for example calculating the value of $C^2$, until results of previous instructions, for example calculating $A^2$ and $B^2$, are known, the instruction that must wait is said to be dependent on the instructions that must be completed earlier. To deal with these dependencies, various hardware and software dependency tracking techniques have been developed.

Normally, results produced by instructions are temporarily stored in registers (called destination registers) before being sent for longer term storage in main memory. Likewise, values consumed by instructions are read from registers (called source registers). Note that the same register may be used as a destination register by one instruction, and as a source register by another instruction. Thus, in the example above, a first register may be used as a destination register by the instruction calculating the value of $A^2$, and as one of two source registers by the instruction calculating the value of $C^2$.

An additional layer of complexity is added when a processor implementation has to handle aliasing, which involves storing the results of a lesser width (e.g. 32 bit) instruction into a greater width (e.g. 64 bit) register. Aliasing can be particularly useful in some modern processors designed to provide backwards compatibility with older processors. For example, a backwards compatible processor designed to execute 64 bit (or even 128 bit) code, may still be capable of running 32 bit code written for older processors. Because 32 bit code usually produces 32 bit results even when being executed by a 64 bit processor, the 64 bit processor may employ aliasing techniques that allow it to store different 32 bit results onto different portions of a single 64 bit register.

Often, processors that employ out of order processing and/or aliasing techniques use a reorder buffer, or some similar method of storing interim values. Referring to FIG. 1, a prior art method of using a reorder buffer is discussed. Reorder buffer (ROB) 110 and architectural register file (ARF) 120 are both sets of registers. A software program only sees the registers in the ARF 120, so if an instruction specifies 64 bit register d0 or 32 bit registers f1 or f0, the software is only aware of physical registers 122, 123, or 124, respectively. The 64 bit X register 112, 64 bit Y register 116, and 32 bit registers 113, 114, 117, and 118 in ROB 110 are used by hardware to store interim values produced by instructions executed out of order, results of a predictive branch, partial results, and other "non-finalized" results that are not guaranteed correct.

Once results are finalized, the results are "committed to the architectural state" by moving them from ROB 110 to ARF 120. Assume, for example, that a first load instruction LDF0 specifies 32 bit destination register f0 as a destination register and a second load instruction LDF1 specifies 32 bit destination register f1. Assume further that the instructions are being executed out of order, i.e. LDF1 is executed before LDF0. The software expects the result of LDF0 to be stored in register 124 of ARF 120, and the result of LDF1 to be stored in register 123 of ARF 120. Since the instructions are being executed out of order, however, the hardware temporarily stores the result of LDF0 in 32 bit register 113, which occupies half of 64 bit X register 112, and the result of LDF1 in 32 bit register 118. Note that the temporary results of LDF0 and LDF1 are designated (f0) and (f1) respectively. Once the processor knows that the temporary values (f0) and (f1) are final, those values are moved to registers 124 and 123, respectively, and an instruction specifying 64 bit register d0 as a source is free to operate on register d0.

While the method just described ensures that the third instruction, which specifies 64 bit local register d0 as a source register, gets a finalized value, the method is less than perfect. For example, the third instruction must wait for both f1 and f0 to commit to the architectural state, which can reduce processor efficiency. As an alternative to waiting for both 32 bit values to commit to the architectural state, the processor must be designed to track up to two dependencies for a single source register d0, which is expensive in silicon area and power In effect, traditional processors require a tradeoff between a lower performance alternative (e.g. waiting until producers commit) and a higher performance, but higher cost alternative, (e.g. tracking multiple dependencies per register).

SUMMARY

If a consumer instruction specifies a greater-width source register comprised of results provided by multiple lesser-width producer instructions, the number of dependencies that must be tracked per source register can be decreased by storing the results of the producer instructions appropriately. The producer instructions are configured to produce lesser-width results, and to place those results in lesser-width logical registers. At least one of the producer instructions is transformed, however, so that rather than simply storing its result in a lesser-width destination register, the transformed instruction stores its result into a greater-width logical register along with one or more lesser-width values held in other lesser-width logical registers.

In at least one embodiment, the instructions are transformed as indicated by a predictor such as an age indicator, a processor performance metric indicating the number of pipeline stalls, or the like. The predictor may indicate that only particular instructions are to be transformed, for example instructions specifying even or odd destination registers, that all instructions of a particular type are to be transformed, that all instructions are to be transformed regardless of type or destination register specified, or that no transformation should be performed on any instructions Other forms of the invention include a processor comprising one or more execution units, a plurality of greater-width registers capable of accommodating aliased lesser-width registers, and a decode unit. The decode unit is used to modify an original instruction that specifies a first lesser-width register as a destination register. After modification, the instruction functions to load its result into a single greater width register along with a value held in a second lesser-width register. In at least one embodiment, the stored greater-width value is used as the source value for a consumer instruction that would otherwise not be able to complete execution until the stored greater-width value was committed to an architectural state. Additionally, the number of dependencies that need to be tracked for the greater-width destination register specified by the consumer instruction can be reduced.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
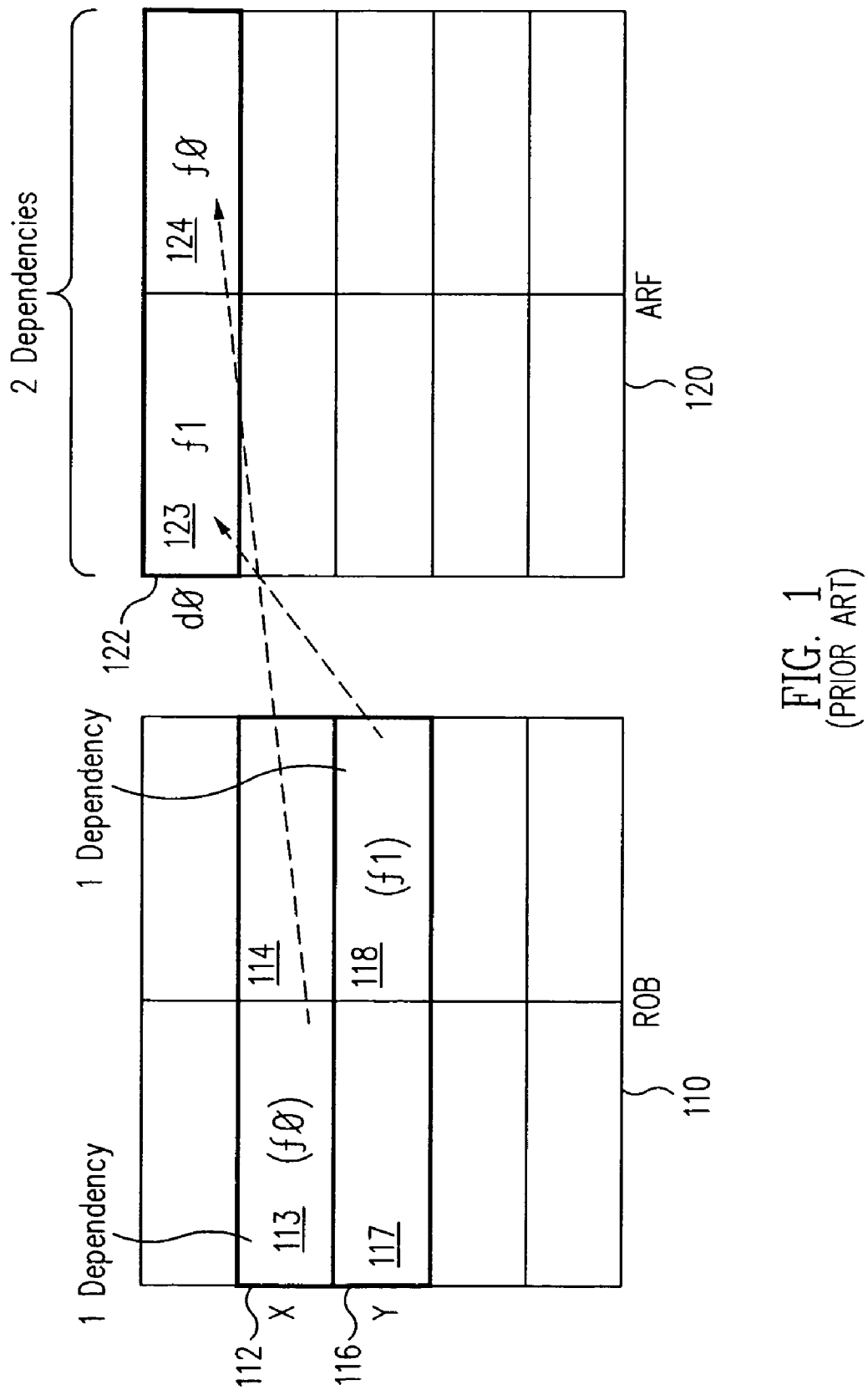
FIG. 1 is a block diagram illustrating the use of a prior art reorder buffer and architectural register file.

Various embodiments of the present invention find application where a greater width consumer instruction, for example a double precision square root (SQRT) instruction, specifies as its source a register holding values resulting from multiple lesser width instructions, for example a pair of load (LDF) instructions. One set of circumstances giving rise to such a situation may occur when 32 bit LDF instructions are used in a processor that uses aliased registers.

The SQRT instruction may specify a 64 bit source register that holds the results of two 32 bit LDF instructions. In prior art processors employing a reorder buffer or some similar form of non-architectural register storage, the two LDF instructions will each get a 32 bit value from memory, and each LDF instruction will store its 32 bit value in respective storage locations of the reorder buffer. Once both 32 bit values have been loaded from memory, the appropriate registers in the reorder buffer are committed to the architectural state, where each of the 32 bit values will be stored in respective halves of the 64 bit architectural register specified by the SQRT instruction. The SQRT instruction will then be able to obtain both 32 bit values from the single 64 bit architectural register. In order to perform the SQRT instruction, however, the processor will have either waited for the two 32 bit values to be separately moved to the 64 bit architectural register, or will have had to track two dependencies, one for each of the 32 bit values eventually stored in the single 64 bit source register specified by SQRT.

Figure 2:
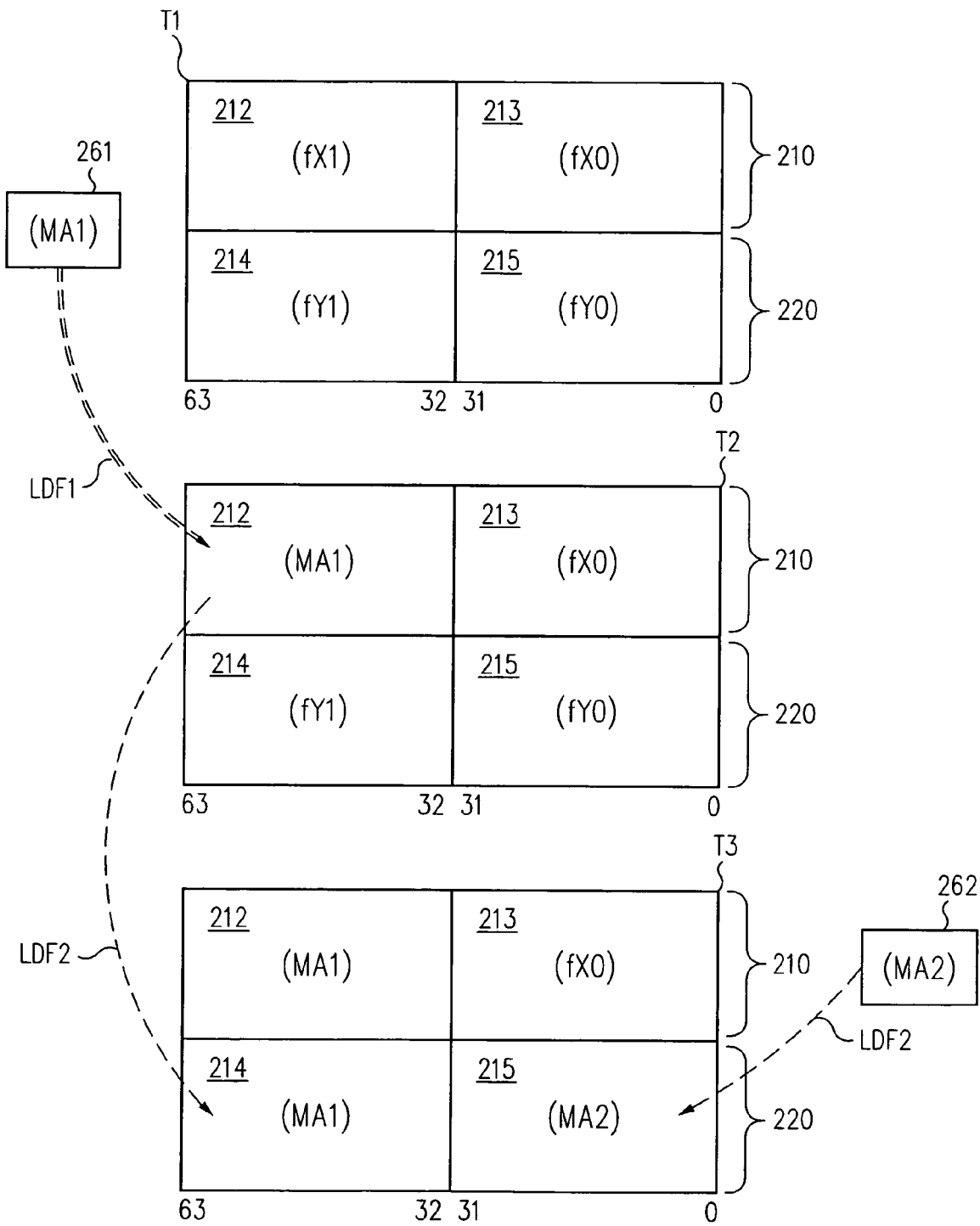
FIG. 2 is a block diagram showing a group of registers after a series of load operations involving a transformed load instruction and a non-transformed load instruction according to an embodiment of the present invention.

Referring now to FIG. 2, a method for decreasing the number of dependencies that must be tracked for the SQRT source register is discussed. FIG. 2 shows the contents of two 64 bit logical registers 210 and 220 at times T1, T2, and T3. Each 64 bit logical register can hold a single 64 bit word, or multiple lesser-width words totaling 64 bits. For purposes of discussion, logical registers 210 and 220 can each be viewed as including two 32 bit logical registers. As illustrated, 64 bit register 210 includes 32 bit register 212, which occupies bit positions 32–63, and 32 bit register 213, which occupies bit positions 0–31. Bits 32–63 of 64 bit register 220 serve as a 32 bit register 214, and 32 bit register 215 occupies bit positions 0–31 of register 220.

FIG. 2 also shows two memory locations 261 and 262, which hold values (MA1) and (MA2). Note that in FIG. 2, the symbols enclosed in parentheses are used to prevent confusion between values and commonly used register names. The parentheses are not intended to indicate pointers or indirect addressing. At this point, one should note that 64 bits and 32 bits are used as a matter of convenience, for discussion purposes only. For example, if a processor uses 128 bit registers, then registers 212–215 could be 64 bit registers rather than 32 bit registers. It should also be pointed out that the teachings set forth herein also apply to registers having other than a "full/half" type relationship. For example, registers 210 and 220 could be divided into four 16 bit registers, etc. Other, less conventional, decompositions are also possible.

At time T1, 32 bit registers 212–215 hold indeterminate values designated respectively as (fx1), (fx0), (fy1), and (fy0). A first instruction LDF1 is executed specifying memory location 261 as its source, and register 212 as its destination. At time T2 the first instruction LDF1 has taken the 32 bit value (MA1) stored in memory location 261, and transferred that value to register 212. In this example, the first instruction LDF1 performs its functions consistent with known LDF instructions, resulting in register 212 being loaded with the value (MA1), without affecting registers 213–215.

After the first instruction LDF1 has loaded the value (MA1) into register 212, a second instruction LDF2 is executed. The second instruction LDF2 specifies memory location 262 as the source, and register 215 as the destination. This second instruction LDF2, however, is transformed according to the principles disclosed herein. Consequently, instead of simply storing the value (MA2) into register 215, the transformed instruction LDF2 stores (MA2) into register 215, but also reads the contents at register 212, and stores the contents of register 212 into register 214. Thus, in response to the instruction LDF2, which specified a 32 bit destination, the processor executing the second instruction LDF2 stores a full 64 bit value into register 220. In this example, that 64 bit value is comprised of the results of both the first instruction LDF1 and second instruction LDF2.

Any 64 bit consumer instruction that needed the results of both the first instruction LDF1 and second load LDF2 will now be able to access those values from a single 64 bit logical register. Assuming that the processor executing these instructions employs a reorder buffer, then the consumer instruction would not need to wait for any values to commit to architectural state. In addition, the consumer instruction would only need to track dependency on the second instruction LDF2, because the second instruction LDF2 would be responsible for tracking its own dependency on the first instruction LDF1. Note that although the total number of dependencies that need to be tracked may not be reduced, the number of dependencies per logical register is reduced.

Figure 3:
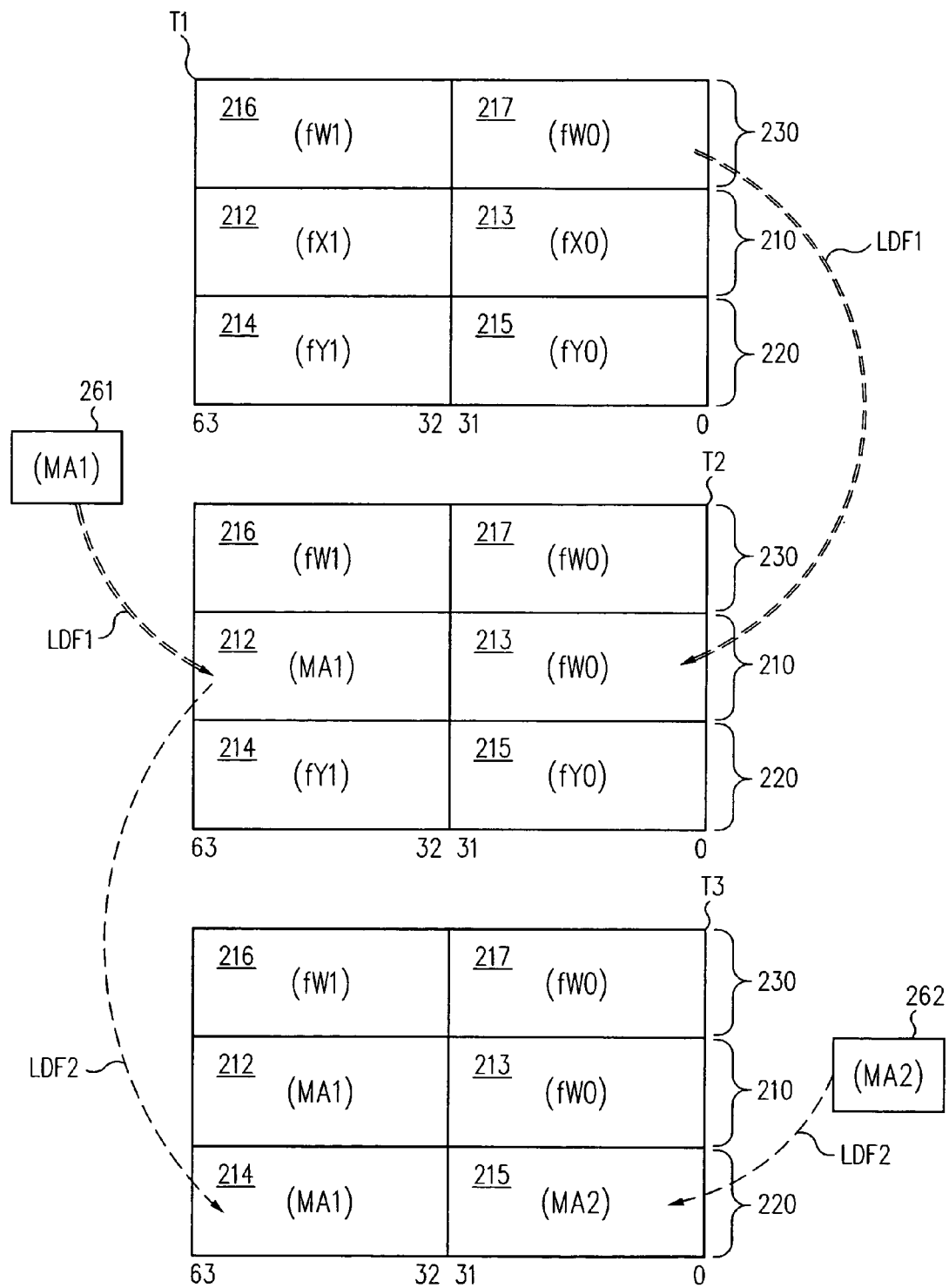
FIG. 3 is a block diagram showing a group of registers after a series of load operations involving two transformed load instructions according to another embodiment of the present invention.

Referring next to FIG. 3, an example illustrating the effect of transforming both the first instruction LDF1 and the second instruction LDF2 will be discussed. Note that the register configuration illustrated in FIG. 3 includes an extra 64 bit logical register 230 made up of two 32 bit logical registers 216 and 217. The extra register 230 is included so that the effect of transforming first instruction LDF1 can be clearly illustrated.

As discussed above, the behavior of a non-modified LDF instruction specifying memory location 261 as the source and register 212 as the destination would be to place the contents (MA 1) of memory location 261 into the specified destination register 212. The first instruction LDF1 in the present example, however, is modified/transformed according to an embodiment of the present invention. Consequently, when first instruction LDF1 is delivered to the processor, the processor transforms first instruction LDF1 so that instead of loading only the 32 bit value MA1 into register 212, first instruction LDF1 also loads the contents (fw0) of register 217 into register 213. In effect, the 32 bit instruction LDF1 performs a 64 bit load of register 210. Second instruction LDF2 specifies memory location 262 as a source and register 215 as a destination. When second instruction LDF2 is received by the processor, the processor modifies second instruction LDF2 so that in addition to performing the specified 32 bit load of (MA2) into register 215, second instruction LDF2 also stores the contents (MA1) of register 212 into register 214. In effect, transformed instruction LDF2 performs a 64 bit load of register 220.

The transformation of one or more instructions as just described is particularly useful when 64 bit processors are performing 32 bit loads from memory to avoid problems with memory boundaries and alignment. Since memory loads are usually performed in order, it is common for a first LDF instruction to load the contents of a particular memory location into the first half of one register, and for the subsequent LDF instruction to load the contents of the next memory location into the complimentary half of the next register. So, for example, when performing 32 bit memory loads it is common for a first LDF instruction to load (MA1) into register 212, and for the next LDF instruction to load (MA2) into register 215. Because of this, the contents of the registers may be arranged as shown in FIGS. 2 and 3, such that the final result in register 220 is the same whether first instruction LDF1 and second instruction LDF2 are both transformed, or whether only the second instruction LDF2 is transformed.

Note that while under the preceding circumstances the correct result is reached regardless of whether one or both LDF instructions are transformed, performing unnecessary instruction transformations can adversely affect processor performance. One time it would be counterproductive to perform transformations is when a processor is performing code that does not include 64 bit instructions, for example code designed to run on legacy processors. In such a case, transforming instructions does not provide any benefit, yet still consumes processor resources.

Because it may be more advantageous to perform instruction transformations on only some instructions, or possibly not to perform any instruction transformations, various embodiments of the present invention include a predictor to control when instruction transformations are performed. In at least one embodiment, the predictor indicates that transformations are to be performed for instructions specifying odd numbered destination registers, for instructions specifying even numbered destination registers, for all instructions regardless of the destination register specified, or for no instructions, under various conditions. The determination of when a processor is to transform instructions may be based on various processor metrics, including, but not limited to, the following: how often a processor's pipeline stalls, how many transformations have been performed within a particular time period, how long transformations have been enabled or inhibited, the type of instruction, the occurrence of an event detrimental to processor performance caused by unnecessary instruction transformations, how often instructions specifying double width registers occur, whether single width bit memory transfers are being used, and other suitable metrics. In one embodiment, the length of time since the last instruction with a 64 bit source register is determined, and compared against a threshold value. If this threshold value is exceeded, then the processor must be executing 32 bit code and transformations are not required.

Figure 4:
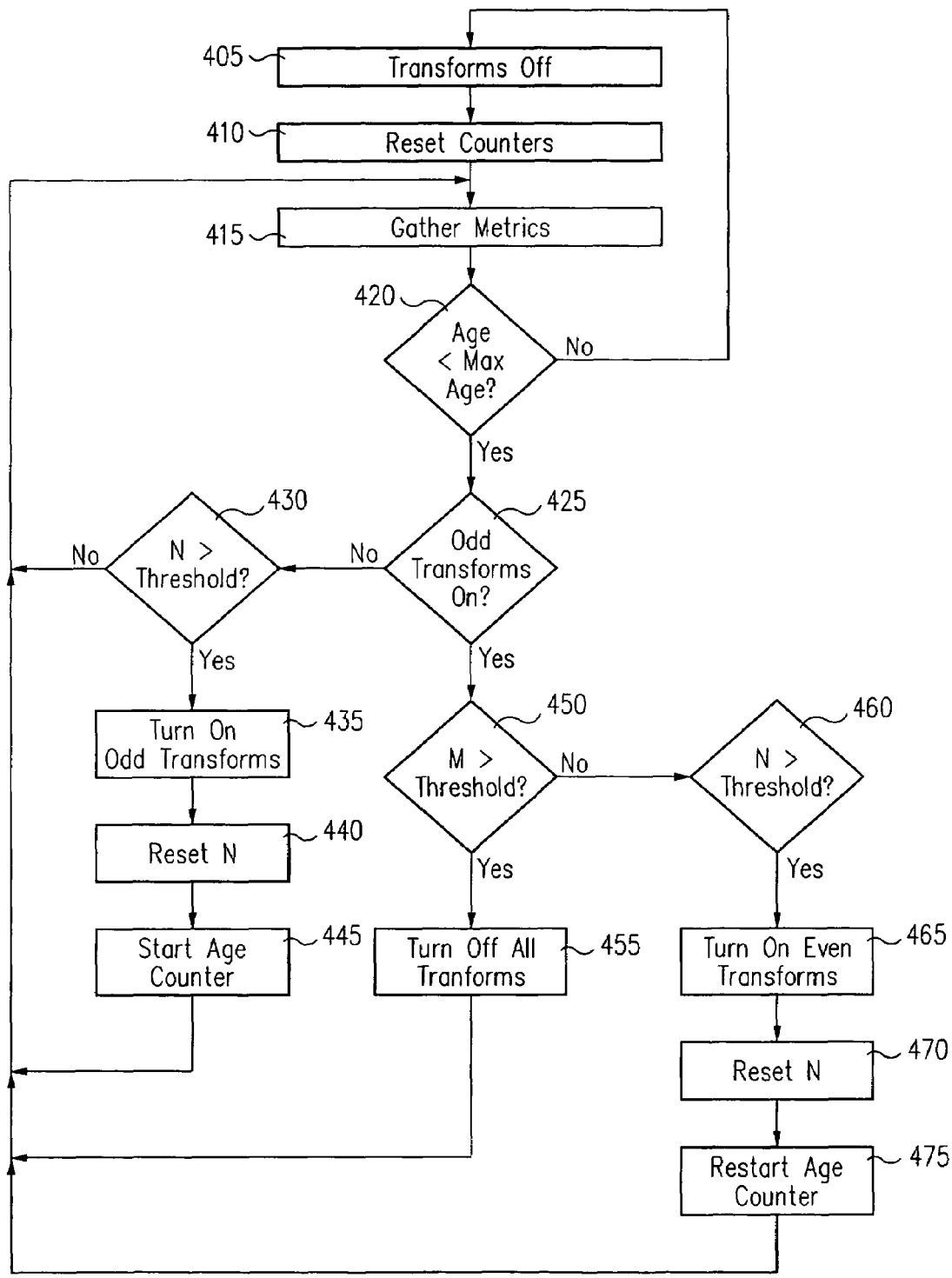
FIG. 4 is a flow chart illustrating how a predictor controls instruction transformation according to an embodiment of the present application.

Referring next to FIG. 4, a method by which a predictor decides when to enable instruction transformations is discussed according to one embodiment of the present invention. The predictor begins by ensuring that transformations are turned off at 405. The predictor then resets all of the counters at 410. In at least one embodiment, an age counter and two threshold counters are used by the predictor, and all of these counters are initially set to zero. After the predictor is initialized, it begins gathering metrics at 415. Note that without the transformations turned on, the execution pipeline is forced to stall when it encounters an instruction specifying a 64 bit source register that is dependent on two producer instructions. One of the threshold counters N keeps track of the number of such stalls. In 420, the age counter is checked to make sure that it is less than a maximum age. Of course, the first time through 420, the age indicator has recently been reset, and has not yet started counting.

If the age counter indicates less than the maximum age, then in 425 the predictor checks to see if transformations have been enabled for instructions specifying odd numbered registers. Assuming first that odd transformations have not been turned on, the predictor checks the threshold counter N to verify that the number of pipeline stalls has not yet exceeded a threshold value. If N is less than the threshold value, the predictor continues to gather performance metrics at 415. If 430 determines, however, that N is greater than a threshold value, indicating that the pipeline execution unit is stalling, then the predictor enables transformations for instructions specifying odd numbered destination registers in 435, the threshold counter N is reset to zero in 440, the age counter is started in 445, and the process continues to gather metrics in 415. In effect, if the processor is stalling because it has to wait for multiple register loads to commit to the architectural state, the predictor turns on transformations for what is presumed to be the "second" load instruction of each set of register loads. In at least one embodiment, the transformations are applied to only certain types of instructions, for example load-type instructions.

If turning on the odd transformations does not stop the execution pipeline from stalling, then N will again exceed the threshold in 460, and the predictor will cause instructions having even numbered destination registers to be transformed in 465, in addition to causing instructions specifying odd destination registers to be transformed. Once again N is reset in 470, and the age counter is restarted in 475. At this point, all instructions are being transformed regardless of whether the instruction specifies an even or odd destination register, and the number of pipeline stalls should be decreased.

The transformation of instructions specifying odd, or even and odd, registers will continue until one of two events occurs. First, if the age counter exceeds the maximum age allowed in 420, then all the transformations are turned off, all counters are reset, and the process starts again from scratch. Using an age counter, in one embodiment, acts as a safety stop to ensure that the need for instruction transformations is reconsidered periodically. The second situation in which the transformation will be discontinued occurs when a second threshold counter M exceeds its threshold value in 450. Second threshold counter M counts the number of events detrimental to processor performance and caused by unnecessary instruction transformations. Once the number of detrimental events exceeds the threshold limit in 450, all instruction transformations are turned off in 455. By employing this second threshold counter M, the predictor can stop transforming instructions when processor performance is being impaired by the transformations.

It should be appreciated that determining which instructions to transform, and when instruction transformations should be carried out, can be implemented using other evaluation criteria than those criteria specifically mentioned above. In addition, the specific thresholds, whether determined empirically or otherwise, can be fixed in hardware or programmed by software as desired. It will also be appreciated that the order in which the various elements illustrated in FIG. 4 are performed may vary, and that depending on the control parameters determined for a predictor, additional or fewer steps than those shown may be employed.

Figure 5:
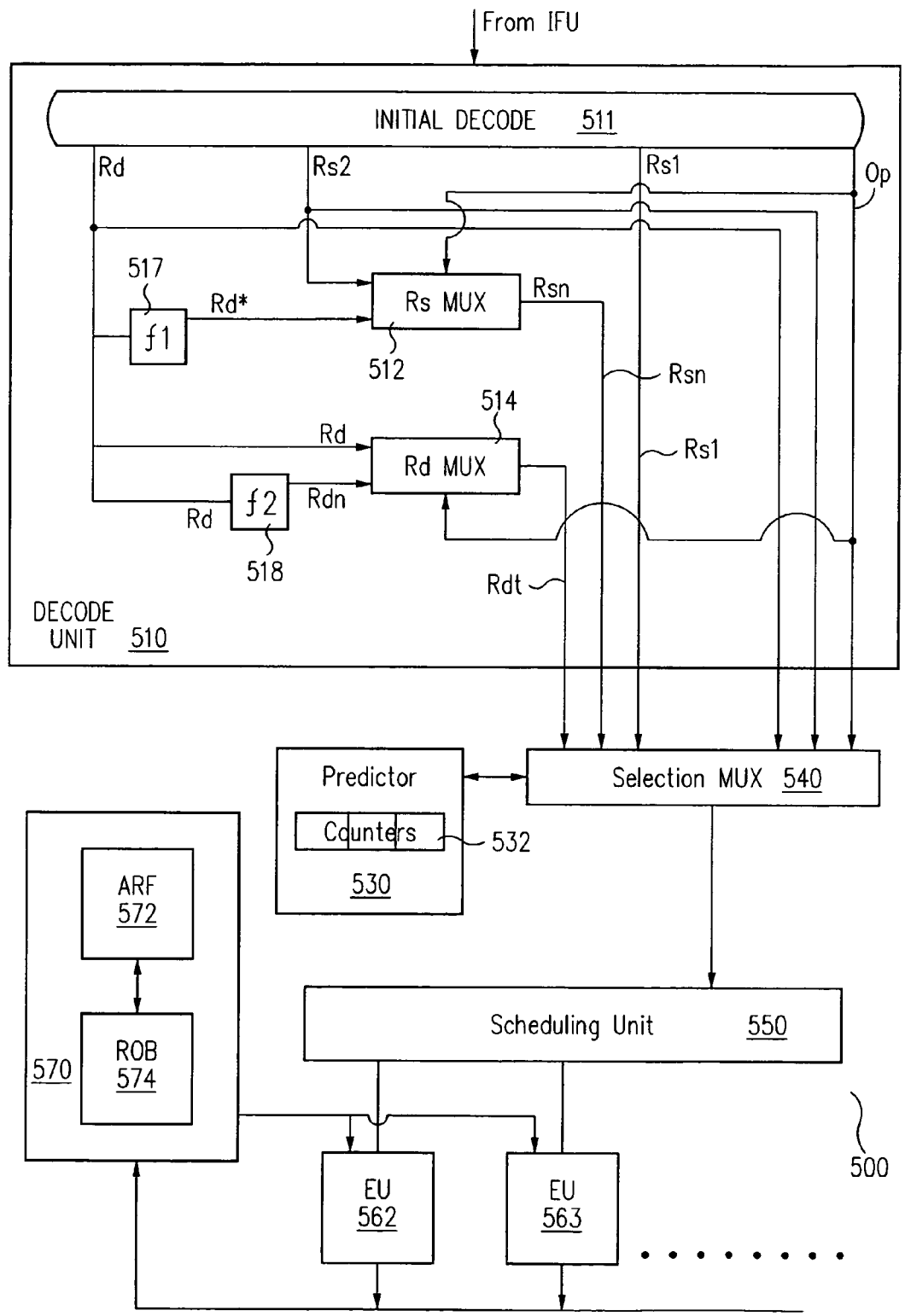
FIG. 5 is a combination block and schematic diagram illustrating a portion of a processor including a decoder according to an embodiment of the present invention.

Referring now to FIG. 5, a processor 500 will be discussed according to one embodiment of the present invention. Processor 500 includes decoder 510 connected to selection MUX 540, which is in turn connected to predictor 530. Selection MUX 540 is connected to scheduling unit 550, and scheduling unit 550 is connected to execution units 562 and 563. Execution units 562 and 563 are each connected to registers 570. Processor 500 also includes various units common to many processors, such as an instruction fetch unit (IFU), instruction and data caches, dependency tracking logic, and the like, which are not illustrated.

In operation, decode unit 510 receives an instruction from an instruction fetch unit (not illustrated). The instruction comprises an arrangement of bits representing an operand, one or more source registers, and one or more destination registers. The exact format of the instruction may vary depending on the processor architecture, but various embodiments of the present invention may be implemented using any suitable instruction format.

Decode unit 510 decodes the instruction, separating the operand from the source and destination specifiers, and then provides the separated operand and source information to scheduling unit 550, through selection MUX 540. Scheduling unit 550 uses the operand to provide the source information to the appropriate execution unit 562 or 563. Execution units 562 and 563 use the register information provided by scheduling unit 550 to obtain appropriate information from either architectural register file (ARF) 572 or reorder buffer (ROB) 574.

In at least one embodiment, decode unit 510 also performs the instruction transformations discussed with reference to FIGS. 2–3. For purposes of the present discussion, it will be assumed that the instruction is capable of specifying an opcode Op, two source registers Rs1 and Rs2, and a destination register Rd, either explicitly or implicitly. For this example, further assume that the instruction type is LDF, that only one of the source specifiers, Rs1 is being used, that Rs1 specifies a 32 bit source, and that Rd specifies a 32 bit destination. Initial decode unit 511, which may be implemented as a traditional decode unit, breaks apart the instruction into its opcode Op, source Rs1–Rs2, and destination Rd components.

In at least one embodiment, processor 500 transforms an instruction by replacing the 32 bit destination register Rd in the instruction being decoded with a single, 64 bit destination register Rdn. The transformation of Rd into Rdn is performed by applying function $f2$ to Rd $f2$ returns the 64 bit register of which 32 bit register Rd forms a part. For example, referring briefly to FIG. 3, if Rd specifies either register 212 or 213, $f2$ will return a value indicating register 210. Likewise, if Rd specifies either register 214 or 215, f2 will return a value of 220 for Rdn.

Another part of the instruction transformation involves obtaining the value to be stored in register Rd*. Function $f1$ returns the register counterpart Rd* of Rd. In at least one embodiment, Rd* is the complement of Rd, so that if Rd specifies an odd numbered 32 bit logical register occupying bits 32–63 of a particular 64 bit register, Rd* will specify the even numbered 32 bit logical register that occupies bits 0–31 of that same 64 bit register. Conversely, if Rd specifies an even numbered 32 bit logical register occupying bits 0–31 of a particular 64 bit register, Rd* will specify the odd numbered 32 bit logical register that occupies bits 32–63.

In one embodiment, RsMUX 512 receives Rd* and Rs2 as data inputs, and opcode Op as a control input. If opcode Op indicates that the instruction being decoded is of a type that is not transformed, RsMUX 512 passes Rs2 to its output, and Rsn is equivalent to Rs2. If, however, opcode Op indicates that the instruction being decoded is of a type that is transformed, then RsMUX 512 sets Rsn to specify the 32 bit register corresponding to Rd*, that is part of the preceding 64 bit register. Referring to instruction LDF1 (FIG. 3) for an example, Rd corresponds to register 212, Rd* corresponds to register 213, the preceding register (i.e. the register in which the preceding instruction would have stored its value) corresponds to 230, and Rsn will be set to register 217 (the 32 bit register corresponding to Rd* in 64 bit register 230). For instruction LDF2, Rsn would indicate register 212. Note that in cases where the instruction is of the type to be transformed, if the original Rd is even, then Rsn will be odd and if the original Rd is odd, then Rsn will be even.

RdMUX 514 receives Rd and Rdn as data inputs, and opcode Op as a control input. If opcode Op indicates that the instruction is of a type that will be transformed, then Rdt is set equal to Rdn. If, however, opcode Op indicates that the instruction being decoded is not of a type that will be transformed, then RdMUX passes Rd, so that Rdt is equal to Rd.

Selection MUX 540 receives the values originally produced by initial decode unit 511, including Rd, Rs2, Rs1, and Op. Additionally, selection MUX 540 receives transformed signals Rdt, and Rsn. Consequently, for any instruction that may be transformed, selection MUX 540 has both the non-transformed results of the initial decode as well as the transformed results. All that remains is for the processor 500 to determine whether to execute the transformed instruction, or to execute the instruction as originally provided to processor 500. This determination is, in the illustrated embodiment, performed by predictor 530.

Predictor 530 includes counters 532 as well as any additional logic (not specifically illustrated) to start, stop, and evaluate the counters 532. In addition, predictor 530 may include connections (not illustrated) to various processor logic used to monitor stalls, and/or other processor metrics, or may itself include such logic (not illustrated). The function of predictor 530 has been previously discussed with reference to FIG. 4, and those skilled in the art may construct various logic circuits to implement the functions of predictor 530 in accordance with the teachings set forth herein.

In one embodiment, predictor 530 is not included in processor 500. Instead, a subset of processor instructions are always transformed. Alternatively, a mode signal (not illustrated) may be provided in place of or in addition to predictor 530, so that whenever processor 500 is placed in a transform mode, either under software control or otherwise, some or all appropriate instructions may be transformed regardless of processor performance metrics.

It should be appreciated that although the illustrated embodiment performs the transformation of instructions at an early stage, and later uses the predictor to select transformed or non-transformed register identifiers, other embodiments transform instructions being decoded only after the predictor determines that a transformation should be performed. In addition, even though various elements of processor 500 are shown either as part of decode unit 510 or external to decode unit 510, it should be appreciated that these elements may be either included with or excluded from decode unit 510. Also, predictor 530 and selection MUX 540 may be combined, and/or selection MUX may rely on a combination of output from predictor 530 and opcode Op, or other signals, values, etc., in determining which signals and information to pass to scheduling unit 550.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method facilitating dependency tracking by a processor that overlays plural lesser-width logical registers on each of at least some greater-width logical registers, the method comprising:

generating an efficiency predictor, wherein said generating step includes selectively asserting a signal based on a processor performance metric by determining a number of pipeline stalls and comparing the number of pipeline stalls to a threshold value; and based on the efficiency predictor, placing a lesser-width instruction result destined for a first lesser-width logical register into either the first lesser-width local register or a greater-width logical register along with one or more lesser-width values held in other lesser-width logical registers.

2. A method facilitating dependency tracking by a processor that overlays plural lesser-width logical registers on each of at least some greater-width logical registers, the method comprising:

generating an efficiency predictor, wherein said generating step includes selectively asserting a signal based on a processor performance metric by determining a number of times the placing has been performed and comparing the number of times the placing has been performed to a threshold value; and based on the efficiency predictor, placing a lesser-width instruction result destined for a first lesser-width logical register into either the first lesser-width local register or a greater-width logical register along with one or more lesser-width values held in other lesser-width logical registers.

3. A method for use in a processor, the method comprising:

selecting, in an execution sequence of instructions, an original instruction configured to produce a lesser-width result and place the result into a first lesser-width logical register, based on a processor performance metric, an age counter or an efficiency predictor;

said selecting step includes determining a number of pipeline stalls and comparing the number of pipeline stalls to a threshold value; and transforming the original instruction into a transformed instruction configured to place the result of the original instruction into a greater-width logical register along with one or more lesser-width values held in other lesser-width logical registers.

4. A processor comprising:

one or more execution units;

a plurality of greater-width registers capable of accommodating aliased lesser-width registers, the plurality of greater width registers coupled to said one or more execution units;

a decode unit coupled to said plurality of greater width registers and said one or more execution units, said decode unit, in response to an efficiency predictor, is operable to modify an original instruction specifying a first lesser-width register as a destination register, the modified instruction loading a result of the original instruction and a value held in a second lesser-width register into a single greater width register; and wherein the decode unit includes at least one counter, and wherein the decode unit modifies the original instruction based on a value of the at least one counter.

5. The processor as in claim 4 wherein the at least one counter is to indicate a number of pipeline stalls.

6. The processor as in claim 4 wherein the at least one counter is to indicate a period during which instructions have been modified.

7. A processor that selectively modifies an instruction sequence presented thereto for execution, the selective modification replacing an original instruction of the instruction sequence to generate a modified instruction, wherein the original instruction specifies a first lesser-width register as a destination register, and the modified instruction specifies loading a result of the original instruction and a value held in a second lesser-width register into a single greater width register, comprising:

at least one counter, wherein the processor selectively modifies the instruction sequence based on a value of the at least one counter; and the processor placing the result of the original instruction and the value held in the second lesser-width register into the single greater width register.

8. The processor as in claim 7 wherein the at least one counter is to indicate a number of pipeline stalls.

9. The processor as in claim 7 wherein the at least one counter is to indicate a period during which instructions have been modified.

10. A processor comprising:

means for controlling under what circumstances an original instruction, specifying a first lesser-width register as a destination register, is permitted to be modified, said means for controlling includes means for initiating modification of the original instruction to occur based on a performance metric;

means for modifying, the original instruction when said means for controlling permits; and means for loading a result of the original instruction and a value held in a second lesser-width register into a single greater-width register in response to the modified instruction, said second lesser-width register not within the greater-width register.

11. The processor as in claim 10 wherein the control means further includes means for determining a number of pipeline stalls.

12. The processor as in claim 10 wherein the control means further includes means for determining a period during which instructions have been modified.

* * * * *